SERIAL TO PARALLEL DATA CONVERTER

Filed April 26, 1966 2 Sheets-Sheet 1

INVENTORS R. G. DE WITT
J. P. FORDE
BY Leonard U. Arnold
ATTORNEY

July 30, 1968 R. G. DE WITT ET AL 3,395,400

SERIAL TO PARALLEL DATA CONVERTER

Filed April 26, 1966 2 Sheets-Sheet 2

United States Patent Office 3,395,400

Patented July 30, 1968

3,395,400
SERIAL TO PARALLEL DATA CONVERTER

Russell G. De Witt, Berkeley Heights, and John P. Forde, Monmouth, N.J., assignors to Bell Telephone Laboratories, Incorporated, New York, N.Y., a corporation of New York Filed Apr. 26, 1966, Ser. No. 545,504
4 Claims. (Cl. 340—172.5)

This invention relates to data conversion and more particularly relates to the conversion of continuous high speed data in serial form into words of parallel bits suitable for assimilation by a computer.

Data in serial form must first be converted into parallel form before it can be applied to the direct data channel input of a digital computer. This conversion is generally accomplished by the use of a serial to parallel converter circuit. Such a circuit contains a store and bits of serial data are read in and stored until a predetermined number of bits have been stored. The bits are then read out in parallel and applied to the direct data channel input of a computer. Such read out must take place in the time interval between reception of the last serial bit of the predetermined number stored and the reception of the immediately succeeding bit in order to clear the store and make it ready to receive succeeding bits and repeat the procedure. Where the bit rate of the serial data is very high such read out must be done at a rapid rate requiring a highly sophisticated serial to parallel converter of relatively high cost and complexity.

It is an object of this invention to reduce the cost and complexity of apparatus required to convert high speed serial data into parallel form.

In accordance with this invention the bits of serial data are applied to a shift register until a predetermined number of bits have been stored. Subsequent bits of the input signal are then diverted to a store for a predetermined time during which the shift register is cleared. After the predetermined time the diverted input pulses are read into the shift register at a much higher rate than the bit rate of the input signal and they are followed by the immediately following bits of the input signal. The time during which the data bits are diverted from the shift register and in which read out is accomplished is several times longer than the time between data bits. By increasing the time in which the shift register may be cleared as compared with such time in a conventional serial to parallel converter, the cost and complexity of the resulting apparatus is reduced.

This invention will be more fully comprehended from the following detailed description taken in conjunction with the drawings in which.

Figure 1:
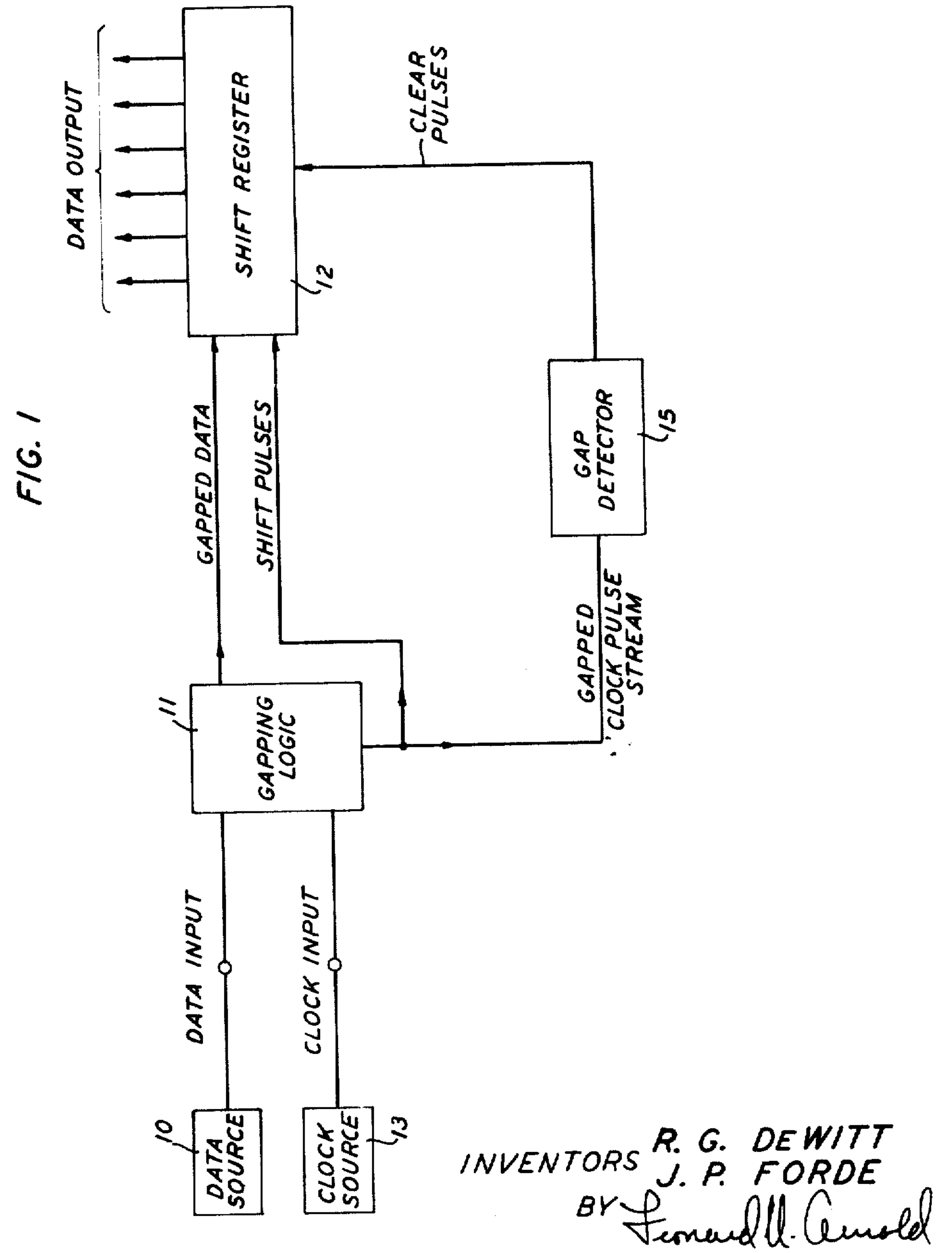
FIG. 1 is a block diagram of a converter embodying this invention.

Serial data from source 10 to be converted to parallel form are applied to the input of a gapping logic circuit 11 shown in block diagram form, in FIG. 1, which transmits a predetermined number of bits of the serial data to a shift register 12 and then interrupts the flow of bits for a predetermined time during which the bits stored in the shift register are read out in parallel. During the interruption in the flow of bits to the shift register 12 incoming bits of serial data are temporarily stored by the gapping logic circuit 11 from which they are later read out at a rapid rate and applied to the shift register. The result of this operation is that after a predetermined number of bits have been stored in the shift register 12, a gap occurs in the flow of data from the gapping logic circuit 11 to the shift register 12. During this gap, or time interval, the bits stored in the shift register 12 are read out in parallel and after read out the bits temporarily stored in the gapping logic circuit 11 are rapidly read into the shift register so that subsequently occurring input data bits may follow.

The gapping logic circuit 11 also generates a so-called "gapped clock" pulse stream which contains a pulse each time a data bit is applied to the shift register. Toward this end clock pulses from a source of clock pulses 13, which occur during each time slot of the incoming data, are applied to the gapping logic circuit 11 which then generates the necessary output in response to the input signal. The gapped clock pulse stream is used as a source of shifting pulses for the shift register 12 so that the bits of data transmitted through the gapping logic circuit 11 to the shift register 12 are properly shifted from stage to stage in the register. In accordance with this invention, a gap detector circuit 15 is also connected to receive the gapped clock pulse stream and generates an output signal whenever a gap occurs in the clock pulse stream. The output signal from gap detector 15 is used to clear the shift register and read out in parallel the data bits stored in the shift register.

Figure 2:
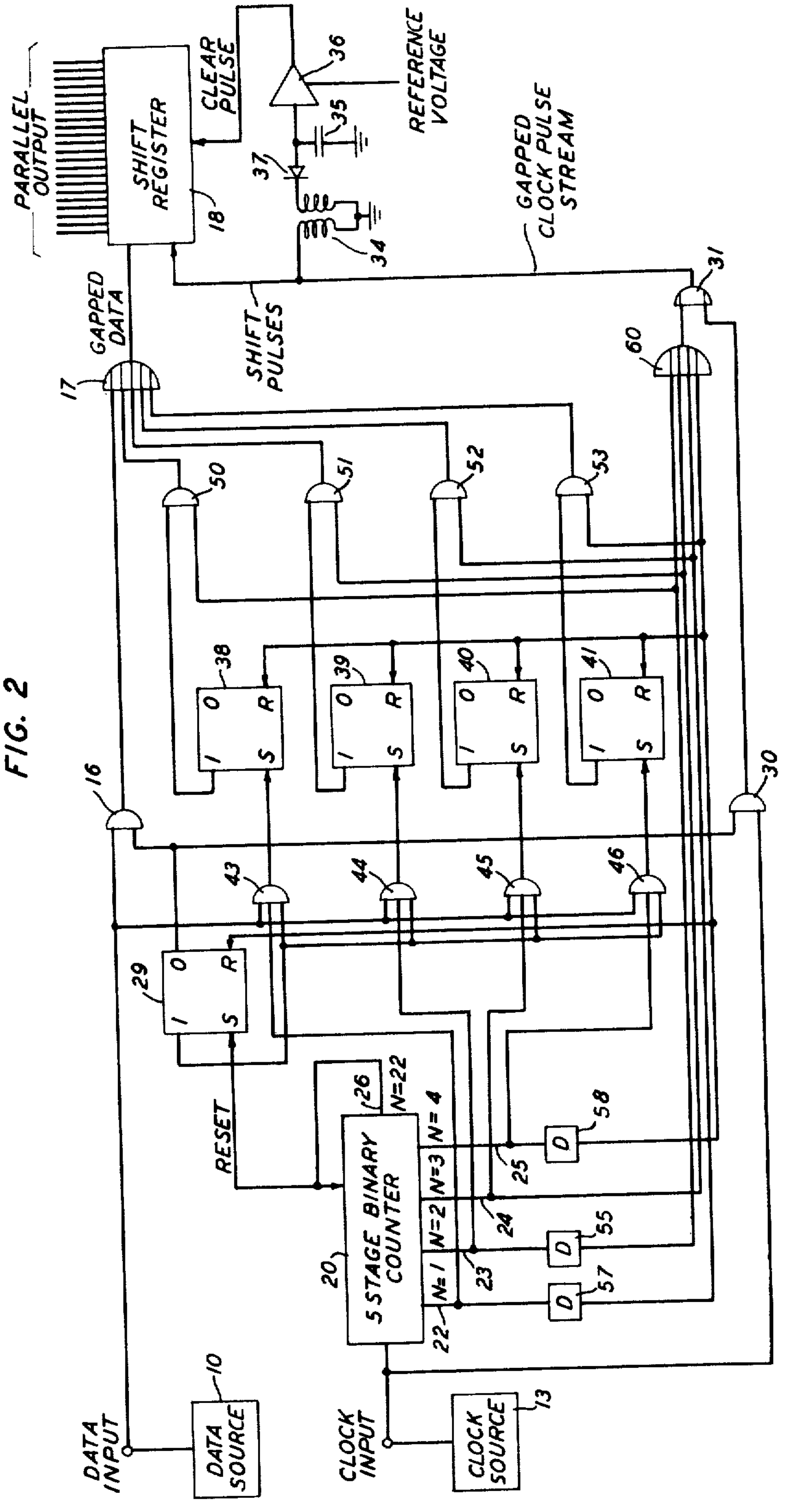
FIG. 2 is a logic circuit diagram of a converter embodying this invention for converting serial data into twenty-two bit words of parallel data.

A converter circuit embodying this invention for generating words of 22 parallel bits at the output of a shift register is shown in logic diagram form in FIG. 2. The serial data from source 10 is applied to an AND gate 16 which is enabled at all times except the gapping interval so that the incoming data is transmitted through AND gate 16 through OR gate 17 to the data input terminal of a 22 bit shift register 18. A source of clock pulses 13 is connected to the input terminal of a five stage binary counter 20 set to sequentially count to 22 and having five output terminals 22, 23, 24, 25, and 26 at which the counts 1 through 4 and 22 respectively produce an output signal. When the first 22 clock pulses have been applied to the five stage binary counter 20, an output signal is generated at output terminal 26 which is fed back to counter 20 to reset it and in addition sets bistable circuit 29 whose zero output terminal is connected to one input terminal of AND gate 16. As a result, AND gate 16 is disabled so that after the first 22 bits of data have been applied to the shift register, the flow of data to the shift register is interrupted.

While the first 22 bits of data were being applied to the input terminal of shift register 18, 22 clock pulses were similarly applied to the shift input terminal of the 22 bit shift register to shift these data pulses from stage to stage within the shift register. This operation was accomplished by applying the clock pulses to an AND gate 30, which was enabled by the reference voltage present at the "0" output terminal of bistable circuit 29 so that the clock pulses were transmitted through AND gate 30, and OR gate 31 to the shift input terminal of the shift register 18. When the five stage counter reached a count of 22 so that bistable circuit 29 was set, AND gate 30 was disabled, interrupting the flow of clock pulses to the shift input terminal of the shift register 18 in the same manner that the bits of data were interrupted.

The gapped clock pulse stream at the output terminal of OR gate 31 is also applied by means of a transformer 34 to a capacitor 35 connected to the input terminal of a differential amplifier 36. A diode 37 is provided between the secondary winding of the transformer 34 and the capacitor 35 to ensure that only pulses of the proper polarity are applied to the capacitor to charge it. In FIG. 2, the diode 37 is poled to pass negative pulses to charge the capacitor 28 on the assumption that clock source 13 generates negative going pulses. When regularly spaced clock pulses are applied to capacitor 35, the capacitor has a voltage across it which exceeds a predetermined threshold, but when the introduced gap occurs in the clock pulse stream the absence of charging pulses causes the capacitor to discharge below that threshold level. The threshold level is determined by a D-C reference voltage applied to differential amplifier 36 so that the amplifier produces an output signal whenever the voltage across capacitor 35 is less than the reference voltage. At that time, in accordance with this invention, the output signal from the differential amplifier 36 is applied to the shift register 18 causing it to read out all the data bits in parallel.

The interruption in the flow of data bits through gate 16 occupies a time interval of four time slots of the clock signal. The latter one and a half time slots of this interval are used to transmit the interrupted data at a high rate to shift register while in accordance with this invention two and one-half time slots are available to clear the shift register. This clearance time in this particular embodiment of the invention is two and one-half times more than that available in conventional serial to parallel converters.

During the four time slots when AND gate 16 is disabled, the data signals are temporarily stored within bistable circuits 38, 39, 40, and 41. This temporary storage is accomplished by enabling gates 43, 44, 45, and 46, each of which has one input terminal connected to the "1" output terminal of bistable circuit 29. A second input terminal of each AND gate 43 through 46 is connected to the data input terminal, while a third input terminal of each AND gate is connected to a respective one of the four output terminals of five-stage counter 20 at which output signals in response to counts of 1 through 4 are produced. Thus, AND gate 43 which is connected to output terminal 22 of five-stage counter 20 transmits the received data signal when a count of one is produced, which event occurs during the first time slot in which data flow to register 18 is interrupted. Similarly, AND gate 44, which has an input terminal connected to output terminal 23 of counter 20, at whose output terminal a pulse is provided in response to a count of two, transmits data received during the second such time slot. Output signals are present at output terminals 24 and 25 of counter 20 during the third and fourth time slots respectively of the interval in which data flow to register 18 is interrupted and these signals are applied to gates 45 and 46 so that these gates transmit received data at those times.

The output terminal of each AND gate 43, 44, 45, and 46 is connected to the set input terminal of a respective one of bistable circuits 38, 39, 40, and 41 so that during the first four time slots of the data signal following the storage of 22 bits of data in shift register 18 when AND gates 43 through 46 are sequentially enabled data are transmitted in sequential fashion to bistable circuits 38 through 41. For example, the output terminal of AND gate 43 is connected to the set input terminal of bistable circuit 38 and since AND gate 43 is enabled during the first of such time slots, the state of bistable circuit 38 represents the data received during that time slot.

The "1" output terminal of each bistable circuit 38 through 41 is applied to a respective one of four AND gates 50 through 53. These AND gates are enabled during the latter portion of the four time slot interval so that the data stored in bistable circuits 38 through 41 is applied in the order received from source 10 to shift register 18. Toward this end AND gate 50 has a second input terminal connected to output terminal 23 of counter 20 by means of a delay circuit 55 which introduces a delay of about one-half time slot so that the data stored in bistable circuit 38 is read into the shift register in the time interval beween the second and third time slots of the gapping interval. Similarly, AND gate 51 has a second input terminal connected to output terminal 24 of counter 20 so that the data stored in bistable circuit 39 is read into the shift register at the beginning of the third time slot of the gapping interval. Delay circuits 57 and 58 connect terminals 22 and 25, respectively, to the third input terminals of AND gates 52 and 53, respectively. Delay circuit 57 introduces a delay of about 2½ time slots so that the data stored in bistable circuit 40 is read out between the third and fourth time slots of the gapping interval. Delay circiut 58 introduces a very short delay so that AND gate 53 is enabled shortly after the beginning of the fourth time slot of the gapping interval. Thus, in accordance with this invention the data stored during the four time slots of the gapping interval is read into the shift register at a rapid rate during the last 1½ time slots of that interval.

The shift pulses to shift the four data bits temporarily stored in bistable circuits 38 through 41 through shift register 18 are derived from the same signals applied to enable AND gates 50 through 53 to clear the data out of those circuits. These signals obtained at the output terminals of delay circuits 55, 57, and 58 as well as terminal 24 of counter 20 are applied to an OR gate 60 which produces an output pulse each time an input pulse is applied to one of its input terminals. These pulses are transmitted through OR gate 31 to the shift input terminal of register 18 where they arrive at the same time as the data bits being read out of bistable circuits 35 through 38 and therefore properly shift the data bits from those circuits into the shift register.

The output signal from delay circuit 58 is also used to reset all the bistable circuits 29, 38, 39, 40, and 41. Thus, after the temporarily stored four bits of data are read into the shift register 18 AND gate 16 is enabled so that the next 18 bits of data are transmitted through it to register 18 without the insertion of any gaps. AND gates 43 through 46 remain disabled during this interval after which they are again enabled to facilitate the temporary storage of data during the gapping interval.

Thus, in accordance with this invention serial data is converted into parallel form using a shift register together with associated apparatus which inserts gaps in the serial data and clock pulse signals applied to the register so that the bits stored in the shift register may be read out over a relatively long time interval. The lengthening of the time interval during which the register may be read out of the store facilitates the use of a relatively low speed register compared to that which would be required in a conventional serial to parallel converter in which the data bits have to be read out of the register during the time interval between received data bits.

It is to be understood that the above described arrangement is merely illustrative of the operation of the principles of our invention. Numerous other arrangements may be devised by those skilled in the art without departing from the spirit and scope of the invention.

What is claimed is:

1. Apparatus for inserting gaps in a stream of serial pulse signals regularly occurring in time slots from a pulse source comprising, in combination, an input terminal connected to receive said pulse signals from said source, an output terminal, a source of clock signals having the same pulse repetition rate and phase as said pulse signals, a counter connected to receive said clock signals for repetitively counting to a predetermined number, means responsive to the output of said counter to permit a predetermined number of time slots of said pulse signal to be transmitted from said input terminal to said output terminal, means responsive to the output of said counter to interrupt the transmission of pulse signals from said input terminal to said output terminal for a second predetermined number of time slots after said signals present in said first predetermined number of time slots have been transmitted, storage means to store pulse signals received from said source of pulse signals during the time interval during which the flow of pulse signals from said input terminal to said output terminal is interrupted, means responsive to the output of said counter to read the pulse signals out of said storage means during the latter portion of the time interval during which the flow of pulse signals is interrupted, and means responsive to the output of said counter to restore the transmission of data from said input terminal to said output terminal after the time interval during which said transmission was interrupted has elapsed.

2. Apparatus for inserting gaps in a continuous stream of high speed pulse signals from a pulse source comprising, in combination, a source of clock signals having the same pulse repetition rate and phase as said pulse signals, a counter connected to receive said clock signals for repetitively counting to a predetermined number, an output terminal, first gating means connected between said pulse source and said output terminal for transmitting said pulse signals to said output terminal, means responsive to the counting of said predetermined number by said counter for disabling said first gating means, second gating means connected to receive said pulse signals and enabled when said counting means counts said predetermined number, storage means connected to said second gating means to store said pulse signals which are transmitted when said second gating means are enabled, third gating means connected between the output of said storage means and said output terminal, and means connected between said counter and said third gating means to enable said third gating means when said counter has a predetermined count stored therein.

3. Apparatus for converting serial data from a data source into parallel data comprising, in combination, a source of clock signals having the same pulse repetition rate and phase as said data signals, a counter connected to receive said clock signals for repetitively counting in cycles to a first predetermined number, an output terminal, first gating means connected between said data source and said output terminal, means to enable said first gating means so that data signals are transmitted to said output terminal, means responsive to the counting of said first predetermined number by said counter circuit for disabling said first gating means, second gating means connected to receive said data signals and enabled in the time interval between the time said counting means attains said first predetermined number and the attainment of a second predetermined number in the succeeding counting cycle, storage means connected to said second gating means to store said data signals which are transmitted during the time interval that said second gating means are enabled, third gating means connected between the output of said sotrage means and said output terminal, means connected between said counter and said third gating means for enabling said third gating means in the last portion of said time interval between the attainment by said counter of said first predetermined number in a first counting cycle and the attainment of said second predetermined number of the succeeding counting cycle so that said stored data are applied to said output terminal prior to the arrival of succeeding data from said source, a shift register connected to said output terminal, and means responsive to said clock signals from said source of clock signals and the output of said counting means to generate an output signal during said time interval between the counting by said counter of said first predetermined number in a first counting cycle and the counting of said second predetermined number in the succeeding counting cycle to clear said shift register.

4. Apparatus in accordance with claim 3 wherein said means to generate said signal to clear said shift register comprises, an AND gate connected to receive said signals from said source of clock signals and enabled by said enabling means which enables said first gating means, a first OR gate having two input terminals, a first connected to the output of said AND gate, a second OR gate whose input terminals are connected to the output terminals of said counter which produce output signals during the time interval between said predetermined count in a first counting cycle and the second predetermined count in said succeeding counting cycle and whose output terminal is connected to the second input terminal of said first OR gate, a capacitor connected to the output of said first OR gate, and a differential amplifier cricuit connected to said capacitor to generate an output signal to clear said shift register when the voltage across said capacitor drops below a predetermined level.

References Cited

UNITED STATES PATENTS

| | | | |
|---|---|---|---|
| 3,185,824 | 5/1965 | Blasbalg et al. | 235—154 |
| 3,201,759 | 8/1965 | Kelly | 340—172.5 |
| 3,215,779 | 11/1965 | Halm et al. | 178—67 |
| 3,226,685 | 12/1965 | Potter et al. | 340—172.5 |

ROBERT C. BAILEY, *Primary Examiner.*

R. RICKERT, *Assistant Examiner.*